United States Patent
Lim et al.

(10) Patent No.: US 10,908,033 B2
(45) Date of Patent: Feb. 2, 2021

(54) PNEUMATIC-BASED TACTILE SENSOR

(71) Applicant: KOREA INSTITUTE OF MACHINERY & MATERIALS, Daejeon (KR)

(72) Inventors: Hyun eui Lim, Daejeon (KR); Sunjong Oh, Seoul (KR); Young Do Jung, Seoul (KR)

(73) Assignee: KOREA INSTITUTE OF MACHINERY & MATERIALS, Daejeon (KR)

(*) Notice: Subject to any disclaimer, the term of this patent is extended or adjusted under 35 U.S.C. 154(b) by 0 days.

(21) Appl. No.: 16/492,429

(22) PCT Filed: Jun. 30, 2017

(86) PCT No.: PCT/KR2017/007002
§ 371 (c)(1),
(2) Date: Sep. 9, 2019

(87) PCT Pub. No.: WO2018/164320
PCT Pub. Date: Sep. 13, 2018

(65) Prior Publication Data
US 2020/0041361 A1   Feb. 6, 2020

(30) Foreign Application Priority Data
Mar. 9, 2017  (KR) .................. 10-2017-0030232

(51) Int. Cl.
*G01L 1/02* (2006.01)
*G01L 1/14* (2006.01)
(Continued)

(52) U.S. Cl.
CPC ................ *G01L 1/02* (2013.01); *G01L 1/14* (2013.01); *G01L 1/16* (2013.01); *G01L 1/20* (2013.01);
(Continued)

(58) Field of Classification Search
CPC ... G01L 1/14; G01L 1/12; G01L 1/122; G01L 1/127; G01L 1/02; G01L 1/16;
(Continued)

(56) References Cited

U.S. PATENT DOCUMENTS

| | | | | |
|---|---|---|---|---|
| 3,638,497 A | * | 2/1972 | Frenkel | G01L 1/14 73/728 |
| 4,627,292 A | * | 12/1986 | Dekrone | G01D 5/20 324/207.17 |
| 2016/0188086 A1 | * | 6/2016 | Yairi | G06F 3/016 345/174 |

FOREIGN PATENT DOCUMENTS

| | | |
|---|---|---|
| JP | 60-131306 A | 7/1985 |
| JP | 06-006277 B2 | 1/1994 |

(Continued)

OTHER PUBLICATIONS

International Search Report dated Feb. 27, 2018 for corresponding international application No. PCT/KR2017/007002, citing the above references.

(Continued)

*Primary Examiner* — Jonathan M Dunlap
(74) *Attorney, Agent, or Firm* — Hauptman Ham, LLP

(57) ABSTRACT

A pneumatic-based tactile sensor according to an exemplary embodiment of the present invention includes: a tactile sense transmitting pneumatic unit for generating pneumatic pressure by an external load applied to a first side; and a tactile sense receiving sensor unit for measuring the load by transforming a magnitude of pneumatic pressure of the tactile sense transmitting pneumatic unit into a displacement.

8 Claims, 8 Drawing Sheets

(51) Int. Cl.
*G01L 1/16* (2006.01)
*G01L 1/20* (2006.01)
*G01L 5/22* (2006.01)
*G01L 1/12* (2006.01)
*G06F 3/044* (2006.01)
*G01L 5/164* (2020.01)
*G06F 3/041* (2006.01)
*G01L 5/169* (2020.01)
*G06F 3/02* (2006.01)
*G06F 3/01* (2006.01)

(52) U.S. Cl.
CPC .............. *G01L 1/12* (2013.01); *G01L 1/122* (2013.01); *G01L 1/127* (2013.01); *G01L 5/164* (2013.01); *G01L 5/169* (2020.01); *G01L 5/22* (2013.01); *G01L 5/228* (2013.01); *G06F 3/016* (2013.01); *G06F 3/0202* (2013.01); *G06F 3/041* (2013.01); *G06F 3/044* (2013.01); *G06F 3/0414* (2013.01); *G06F 3/0416* (2013.01)

(58) Field of Classification Search
CPC . G01L 1/20; G01L 5/164; G01L 5/169; G01L 5/22; G01L 5/228; G06F 3/016; G06F 3/0202; G06F 3/041; G06F 3/0414; G06F 3/0416; G06F 3/044; H01H 2211/002; H01H 2221/038
See application file for complete search history.

(56) References Cited

FOREIGN PATENT DOCUMENTS

| | | | |
|---|---|---|---|
| JP | 10-043142 A | 2/1998 | |
| JP | 10-170377 A | 6/1998 | |
| JP | 2000-321013 A | 11/2000 | |
| JP | 2013-170896 A | 9/2013 | |
| JP | 2013-210214 A | 10/2013 | |
| WO | WO-8807181 A1 * | 9/1988 | ............... G01L 1/02 |
| WO | 2007-083546 A1 | 7/2007 | |
| WO | WO-2012054781 A1 * | 4/2012 | ............. G06F 3/044 |

OTHER PUBLICATIONS

Written Opinion of the International Searching Authority dated Feb. 27, 2018 for corresponding international application No. PCT/KR2017/007002, citing above references.

* cited by examiner

PNEUMATIC-BASED TACTILE SENSOR

CROSS-REFERENCE TO RELATED APPLICATION

The present application is a national stage filing under 35 U.S.C § 371 of PCT application number PCT/KR2017/007002 filed on Jun. 30, 2017 which is based upon and claims the benefit of priority to Korean Patent Application No. 10-2017-0030232 filed on Mar. 9, 2017, in the Korean Intellectual Property Office, which is incorporated herein in its entirety by reference.

TECHNICAL FIELD

The present invention relates to a tactile sensor for sensing a fine contact pressure. More particularly, the present invention relates to a pneumatic-based tactile sensor for minimizing a hysteresis phenomenon caused by an external force, and generation of noise caused by external electromagnetics and temperature, and allowing usage in an extreme environment such as in the water.

BACKGROUND ART

A tactile sense function for obtaining information on surroundings through contact, that is, a contacting force, vibration, roughness of a surface, and a change of temperature with respect to thermal conductivity, is recognized as a medium for collecting next-generation information. A biomimetic tactile sensor for replacing a tactile sense may be used in various medical diagnoses and operations such as a fine operation in blood vessels or a disease diagnosis, it may be used in robots or for implantable arms and legs, and it may be applied to tactile sense proposal skills that are important in realization of virtual environments in the future, so its importance is currently increasing.

The biomimetic tactile sensor may sense a contact pressure and an instant slip with a force/torque sensor with a 6-way degree of freedom already in use in wrists of industrial robots and grippers of the robots, which has a problem of low sensitivity since the size of the sensing portion is relatively large.

In another way, the possibility of developing a tactile sensor using a skill for manufacturing a micro-electro-mechanical system (MEMS) has been proposed, and silicon wafers with advanced processing technology or tactile sensors using flexible materials have recently been under development.

The above-noted static tactile sensor senses by a change of a resistance signal or capacitance caused by transformation when a stress transmitted from the outside is directly transmitted to a sensor or a sensor electrode. The sensor/sensor electrode has a large hysteresis phenomenon caused by an external force or includes a contact portion and a sensing portion together in the case of using a flexible polymer-based nanocomposite material, so noise may always exist because of an external electromagnetic field and temperature, and problems may occur in signal reproduction and stability, and as the use of electronic devices is limited in extreme conditions such as in water, the tactile sensor must not be exposed to the extreme condition such as in the water, and further, sensitivity is reduced when a range of a stress to be sensed is wide, and a tactile sensor having sensing performance with high sensitivity has a small range of stress to be sensed as a drawback, so its use may be limited.

DISCLOSURE

Technical Problem

The present invention has been made in an effort to provide a pneumatic-based tactile sensor for generating pneumatic pressure according to a stress transmitted from the outside, transmitting the same to a pneumatic receiver sensor, and measuring a fine stress applied to a sensor according to a change of resistance of the sensor.

The present invention has been made in another effort to provide a pneumatic-based tactile sensor for separately configuring a pneumatic generator and a pneumatic receiver through a pneumatic transmitting line.

Technical Solution

An exemplary embodiment of the present invention provides a pneumatic-based tactile sensor including: a tactile sense transmitting pneumatic unit for generating pneumatic pressure by an external load applied to a first side; and a tactile sense receiving sensor unit for measuring the load by transforming a magnitude of pneumatic pressure of the tactile sense transmitting pneumatic unit into a displacement.

The tactile sense receiving sensor unit may include one of a magnetic resistance sensor, a capacitance sensor, a piezoresistive sensor, and a contact resistance sensor.

The tactile sense receiving sensor unit may include: a flux-based displacement unit for transforming a magnitude of pneumatic pressure of the tactile sense transmitting pneumatic unit into a flux intensity; and a magnetic resistance sensor unit for measuring a size of the load by sensing a flux intensity of the flux-based displacement unit by use of a magnetic resistance sensor.

The tactile sense receiving sensor unit may be separately disposed from the tactile sense transmitting pneumatic unit, and may further include a tactile sense transmitting pneumatic line for connecting the tactile sense transmitting pneumatic unit and the flux-based displacement unit so as to transmit the pneumatic pressure of the tactile sense transmitting pneumatic unit to the tactile sense receiving sensor unit.

The tactile sense transmitting pneumatic unit may include: a housing including an inside in which a first space is formed, a first side in which a first opening is formed, and a second side on which a pneumatic outlet is formed; and a sensing membrane made of an elastic material for closing and sealing the first opening, wherein a cross-section of the first opening may be larger than a cross-section of the pneumatic outlet.

The flux-based displacement unit may include an inside in which a second space is formed, a first side on which a pneumatic inlet connected to the pneumatic outlet is formed, and a second side in which a second opening is formed, and may include a transmitting membrane for closing and sealing the second opening and a permanent magnet combined to the transmitting membrane.

The magnetic resistance sensor unit may include an inside in which a third space is formed, and a first side in which a third opening is formed to be closed and sealed through the flux-based displacement unit, the transmitting membrane and the permanent magnet may be exposed through the third opening, and the magnetic resistance sensor unit may include a magnetic resistance sensor installed to sense a flux of the permanent magnet.

Sensitivity and a measuring range of a tactile sensor may be controlled according to a flux intensity of the permanent magnet or a position of the permanent magnet.

Advantageous Effects

The pneumatic-based tactile sensor according to the exemplary embodiment of the present invention senses the external force according to the non-contact method caused by the pneumatic pressure, thereby preventing the hysteresis phenomenon and improving sensitivity and accuracy of the sensor.

Further, the pneumatic generator for sensing an external force and the pneumatic receiver for measuring the same may be disposed to be separated from each other through the pneumatic line, thereby overcoming the problem of the electrical element sensor that is sensitive to the external electromagnetic field or the temperature, and allowing measurement at a low/high temperature or in the water where it is difficult to sense by use of a tactile sensor.

MODE FOR INVENTION

Figure 1:
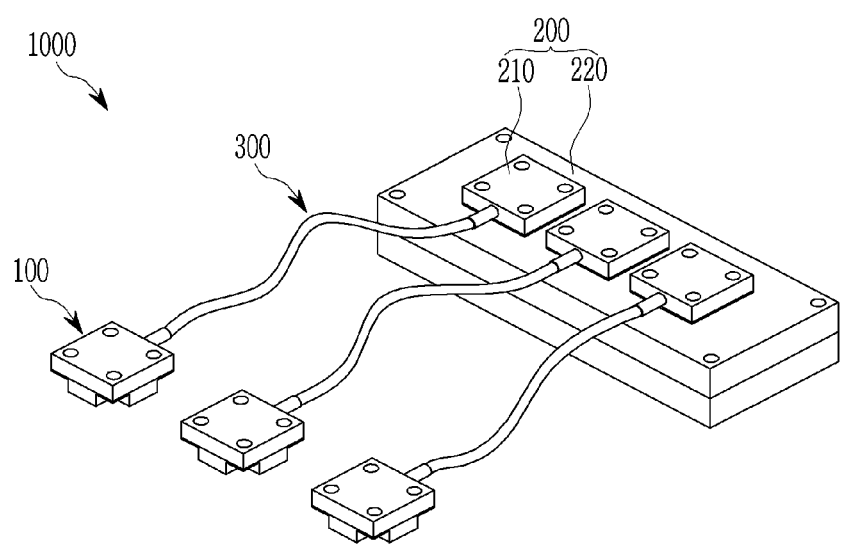
FIG. 1 shows a perspective view of a pneumatic-based tactile sensor array according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

The size and thickness of each configuration shown in the drawings are arbitrarily shown for better understanding and ease of description, and the present invention is not limited thereto.

Throughout this specification and the claims that follow, when it is described that an element is "coupled" to another element, the element may be "directly coupled" to the other element or "indirectly coupled" to the other element through a third element. Unless explicitly described to the contrary, the word "comprise" and variations such as "comprises" or "comprising" will be understood to imply the inclusion of stated elements but not the exclusion of any other elements.

It will be understood that when an element such as a layer, film, region, or substrate is referred to as being "on" another element, it can be directly on the other element or intervening elements may also be present. An upper part of a target portion indicates an upper part or a lower part of the target portion, and it does not mean that the target portion is always positioned at the upper side based on a gravitational direction.

FIG. 1 shows a perspective view of a pneumatic-based tactile sensor 1000 (a tactile sensor hereinafter) according to an exemplary embodiment of the present invention.

As shown, the tactile sensor 1000 is configured with a tactile sense transmitting pneumatic unit 100 (a pneumatic unit, hereinafter), a tactile sense receiving sensor unit 200 (a sensor unit, hereinafter), and a tactile sense transmitting pneumatic line 300 (a pneumatic line, hereinafter) as a default package, and it may include a plurality of pneumatic units 100, sensor units 200, and pneumatic lines 300 and thereby configure a pneumatic-based tactile sensor array. The pneumatic unit 100 generates pneumatic pressure through an external stimulus, and the pneumatic line 300 transmits the pneumatic pressure generated by the pneumatic unit 100 to the sensor unit 200.

The sensor unit 200 is configured with a tactile sense receiving displacement unit for receiving the pneumatic pressure generated by the pneumatic unit 100 from the pneumatic line 300 and generating a displacement, and a sensing portion for sensing the displacement generated by the tactile sense receiving displacement unit and measuring a tactile sense load.

The sensor unit 200 may use sensors that are based on various changes of physical variances where the variances of the sensors are measured by applying a fine stress to the sensor such as a magnetic resistance sensor for changing resistance by sensing a change of intensity of a magnetic field, a capacitance sensor for transmitting a pneumatic pressure generated by a stress provided from the outside to a sensor unit to change a distance between two electrode plates and thereby change capacitance, a piezo-resistive sensor in which resistance ratio of semiconductor crystal changes when an external force is applied to a metal or a semiconductor crystal, or a contact resistance sensor of which resistance changes by a contact area of two conductive plates, and in the present exemplary embodiment, the magnetic resistance sensor with an excellent operational range and sensitivity will be described in detail, but it is not limited thereto.

The sensor unit 200 according to an exemplary embodiment of the present invention is divided into a flux-based displacement unit 210 for transforming the pneumatic pressure of the pneumatic unit 100 into the flux, and a magnetic resistance sensor unit 220 for measuring external contact pressure intensity by sensing magnetic resistance through a change of flux of the flux-based displacement unit 210.

A detailed configuration of the pneumatic unit 100 and the sensor unit 200 will now be described with reference to drawings.

Figure 2:
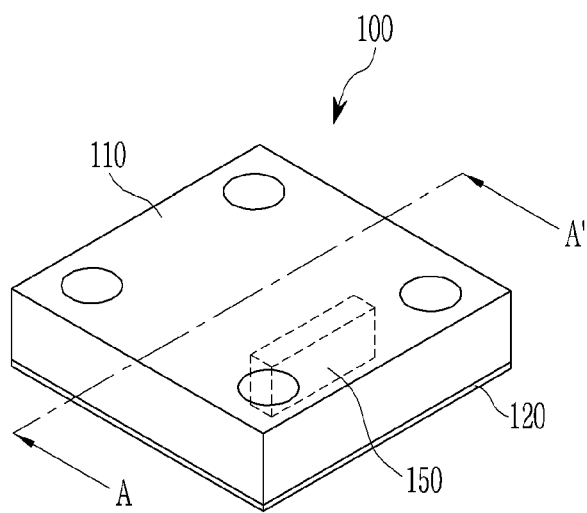
FIG. 2 shows a projective and perspective view of a tactile sense transmitting pneumatic unit according to an exemplary embodiment of the present invention.
Figure 3:
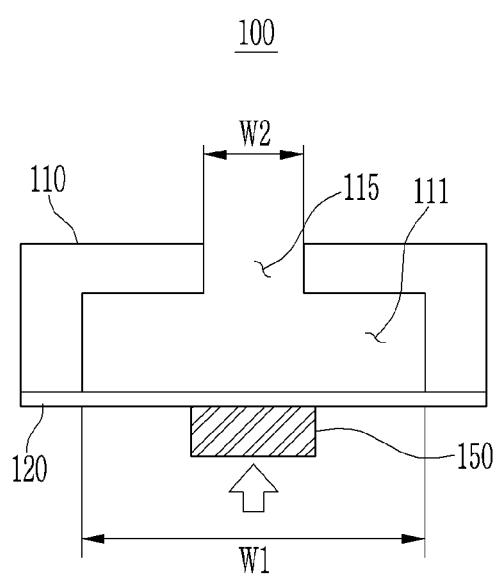
FIG. 3 shows a cross-sectional view in a direction of A-A' of FIG. 2.

FIG. 2 shows a projective and perspective view of a pneumatic unit 100 according to an exemplary embodiment of the present invention, and FIG. 3 shows a cross-sectional view of the pneumatic unit 100. Here, for ease of understanding, FIG. 3 shows a simplified configuration.

Referring to FIG. 2 and FIG. 3, the pneumatic unit 100 may include a housing 110 and a sensing membrane 120. The housing 110 is a parallelepiped in which a first space 111 is formed, and a first opening is formed in a first side and a pneumatic outlet hole 115 is formed in a second side. For example, as shown in FIG. 3, a bottom side of the housing 110 may be opened, and a pneumatic outlet hole 115 may be formed in an upper side. However, the first opening and the pneumatic outlet hole 115 may be disposed at various positions of the housing 110. For reference, FIG. 1 and FIG. 2 show that a pneumatic outlet hole is not formed in an upper side of the housing 110 or a pneumatic outlet hole is formed in a lateral side of the housing 110, and for ease of understanding, FIG. 3 shows that a pneumatic outlet hole 115 is formed in the upper side of the housing 110. As shown in the drawing, modified forms of the position of the pneumatic outlet hole are included in an exemplary embodiment of the present invention.

Further, the above-described housing 110 may be manufactured by using 3D printing, and its shapes may be transformed and manufactured in various ways according to customized shapes. However, the above-described housing 110 is required to have rigidity so that the same may not be changed by a pressure.

The sensing membrane 120 is configured to close and seal a first opening of the housing 110, for example, as shown in FIG. 3, an opening of a lower portion of the housing 110, and it is made of an elastic material. For example, it may be made of a polydimethylsiloxane (PDMS) material, and without being limited to this, it may be one of flexible elastic polymers.

A tactile sense receiving block 150 for directly sensing a tactile sense load may be provided on a lower side of the sensing membrane 120, and a cross-section of the tactile sense receiving block 150 may be formed to be smaller than a cross-section of the sensing membrane 120. When the tactile sense load is sensed by the tactile sense receiving block 150, it is transmitted to the sensing membrane 120, and a change of pressure is sensed by the sensing membrane 120, the sensing membrane 120 is transformed upward, air in the housing 110 is pushed out through the pneumatic outlet hole 115, and a pneumatic pressure may be generated. In this instance, a cross-section W1 of an opening (a first opening) of the housing 110 may be formed to be larger than a cross-section W2 of the pneumatic outlet hole 115 so that the pneumatic pressure generated through the pneumatic outlet hole 115 may be amplified. This is because, when the cross-section of the opening W1 is formed to be narrow, the pneumatic pressure may not be formed or may be formed to be small. The pneumatic outlet hole 115 may be connected to a first end of the pneumatic line 300.

Figure 4:
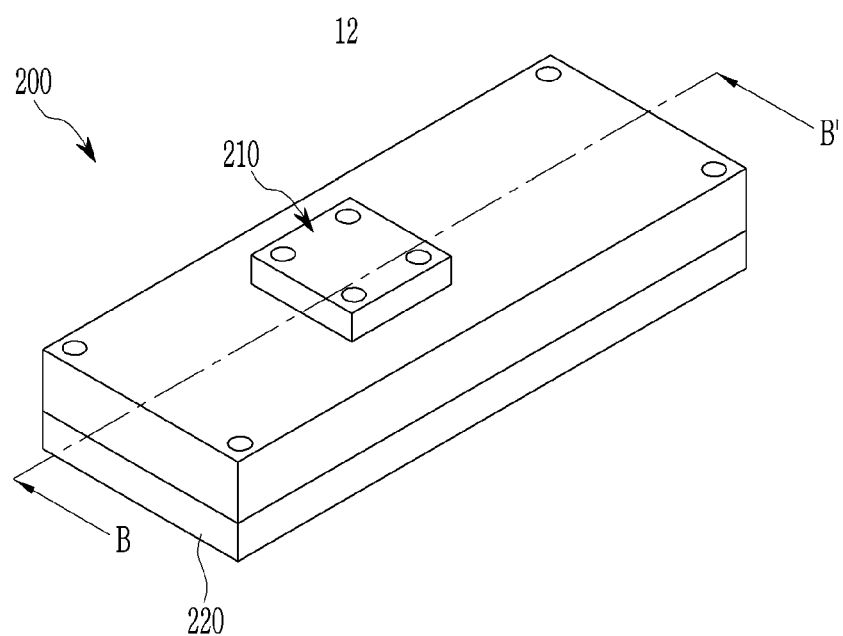
FIG. 4 shows a projective and perspective view of a tactile sense receiving sensor unit according to an exemplary embodiment of the present invention.
Figure 5:
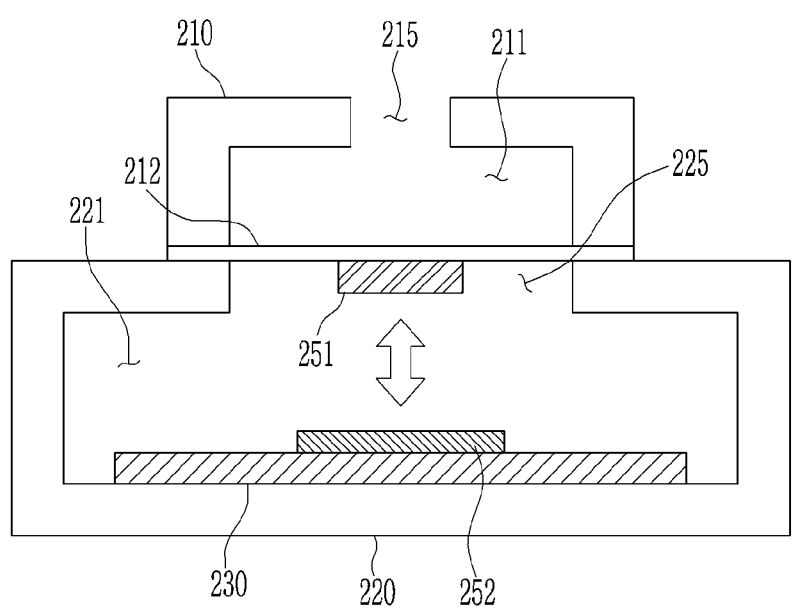
FIG. 5 shows a cross-sectional view in a direction of B-B' of FIG. 4.

FIG. 4 shows a projective and perspective view of a sensor unit 200 according to an exemplary embodiment of the present invention, and FIG. 5 shows a cross-sectional view of the sensor unit 200. Here, for ease of understanding, FIG. 5 shows a simplified configuration.

Referring to FIG. 4 and FIG. 5, the sensor unit 200 may include a flux-based displacement unit 210 and a magnetic resistance sensor unit 220. The flux-based displacement unit 210 includes a transmitting membrane 212, and a permanent magnet 251 may be provided. The flux-based displacement unit 210 is a parallelepiped in which a second space 211 is formed, and a pneumatic inlet hole 215 may be formed on a first side, while a second opening may be formed on a second side. For example, as shown in FIG. 5, a bottom side of the flux-based displacement unit 210 may be opened, and a pneumatic inlet hole 215 may be formed on an upper side. However, the first opening and the pneumatic outlet hole 115 may be disposed at various positions of the housing 110. For reference, FIG. 1 and FIG. 4 show that a pneumatic inlet hole may not be formed in the upper side of the flux-based displacement unit 210 or the pneumatic inlet hole is formed in the lateral side of the flux-based displacement unit 210, and for ease of understanding, FIG. 5 shows that a pneumatic inlet hole 215 is formed in the upper side of the flux-based displacement unit 210. As shown in the drawings, modified forms of the position of the pneumatic inlet hole are included in an exemplary embodiment of the present invention.

Further, the above-described flux-based displacement unit 210 may be manufactured by using 3D printing, and its shapes may be transformed and manufactured in various ways according to customized shapes.

A lower opening of the flux-based displacement unit 210 may be closed and sealed by the transmitting membrane 212, and the permanent magnet 251 may be inserted into the transmitting membrane 212 or may be combined to a lower side of the transmitting membrane 212. The transmitting membrane 212 may be made of a material with a low elastic coefficient so as to transmit a signal that is sensitive to the pneumatic pressure. For example, it may be made of an Ecoflex material with a low elastic coefficient (Young's modulus), and without being limited to this, one of flexible elastic polymers may be used. A second end of the pneumatic line 300 having a first end connected to the pneumatic outlet hole 115 is connected to the pneumatic inlet hole 215 to receive pneumatic pressure generated by the pneumatic unit 100. When the transmitting membrane 212 is transformed downward through the received pneumatic pressure, the permanent magnet 251 combined to the transmitting membrane 212 moves downward and generates a flux.

The magnetic resistance sensor unit 220 includes a substrate 230 and a magnetic resistance sensor 252. A third space 221 is formed inside the magnetic resistance sensor unit 220, and a flux-based displacement unit 210 may be combined to a first side of the magnetic resistance sensor unit 220, for example, as shown in FIG. 5, an upper side of the magnetic resistance sensor unit 220. Particularly, a third opening, that is, a flux sensing opening 225, may be formed on the upper side of the magnetic resistance sensor unit 220 so that the transmitting membrane 212 and the permanent magnet 251 may be linked to the third space 221. That is, the flux sensing opening 225 may be closed and sealed by the lower side of the flux-based displacement unit 210, and the transmitting membrane 212 may be combined to the permanent magnet 251 so that they may be exposed in the third space 221 through the flux sensing opening 225. For example, the magnetic resistance sensor unit 220 may be manufactured by using 3D printing, and its shapes may be transformed and manufactured in various ways according to customized shapes.

A substrate 230 and a magnetic resistance sensor 252 combined to an upper side of the substrate 230 are provided inside the magnetic resistance sensor unit 220, and are configured so that the magnetic resistance sensor may sense the flux of the permanent magnet 251. Therefore, intensity of an external stimulus is calculated according to magnetic resistance measured in the magnetic resistance sensor 252.

This configuration may have the merit of less hysteresis since it uses pneumatic pressure when a pneumatic pressure is generated according to a stress transmitted from the outside, and it is transmitted to the sensor unit 200 to measure a fine stress applied to the tactile sense sensor with a flux size caused by the change of position of an internal magnet as varied resistance of the magnetic resistance sensor 252.

Further, regarding the tactile sense sensor 1000 according to an exemplary embodiment of the present invention, the pneumatic unit 100 and the sensor unit 200 are separately configured and joined by the pneumatic line 300, so the pneumatic unit 100 may be separately disposed from the sensor unit 200. Accordingly, as a merit, the sensor unit 200 is not influenced when the change of an external electromagnetic field or a temperature is large on a portion for transmitting a tactile sense, or when a tactile sense is transmitted in the water.

Further, the tactile sense sensor 1000 according to an exemplary embodiment of the present invention may control sensitivity and a measurement range of the tactile sensor according to a thickness or a material of the sensing membrane 120 of the pneumatic unit 100 or the transmitting membrane 212 of the sensor unit 200. As another exemplary embodiment, sensitivity of the tactile sensor and the measurement range may be controlled depending on flux intensity or position of the permanent magnet 251 combined to the transmitting membrane 212 as a merit.

Figure 6:
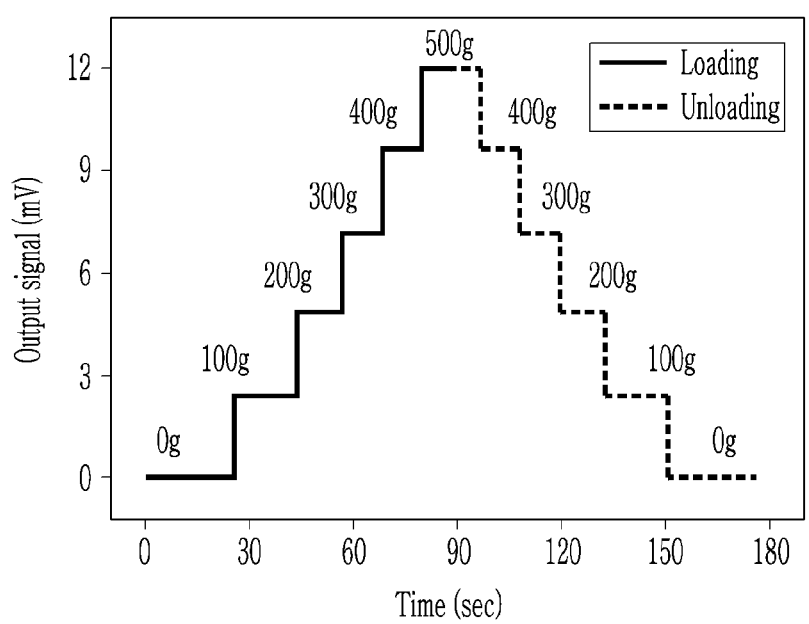
FIG. 6 shows a graph of a detection signal (voltage) according to a tactile sense load (pressure) with respect to time when a tactile sense sensor is used according to an exemplary embodiment of the present invention.
Figure 7:
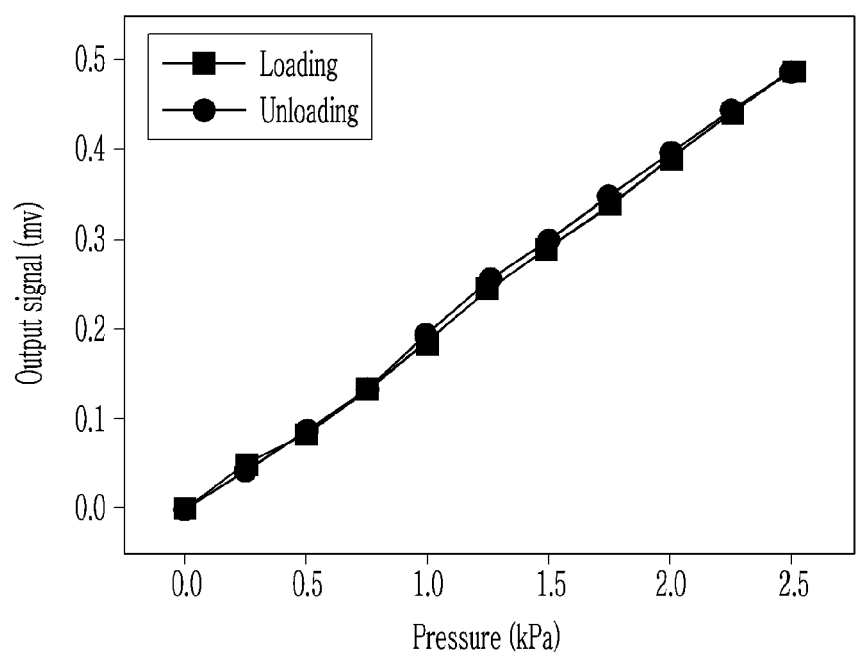
FIG. 7 shows a graph of a detection signal (voltage) according to a tactile sense load (pressure) when a tactile sense sensor is used according to an exemplary embodiment of the present invention.

FIG. 6 shows a graph of a detection signal (voltage) according to a tactile sense load (pressure) with respect to time when a tactile sense is detected by using a tactile sense sensor 1000 according to an exemplary embodiment of the present invention, and FIG. 7 shows a graph of a detection signal (voltage) according to a tactile sense load (pressure) when a tactile sense sensor is used according to an exemplary embodiment of the present invention.

It is found, as shown in FIG. 6, that when a detection signal (voltage) is measured while increasing a load at regular intervals and then the detection signal (voltage) is measured while decreasing the load at regular intervals, as shown in FIG. 7, the change of voltage according to the increase of pressure linearly increases, and the decrease of voltage according to the decrease of pressure linearly decreases. That is, it is found that generation of hysteresis is minimized when the tactile sense load is sensed.

Figure 8:
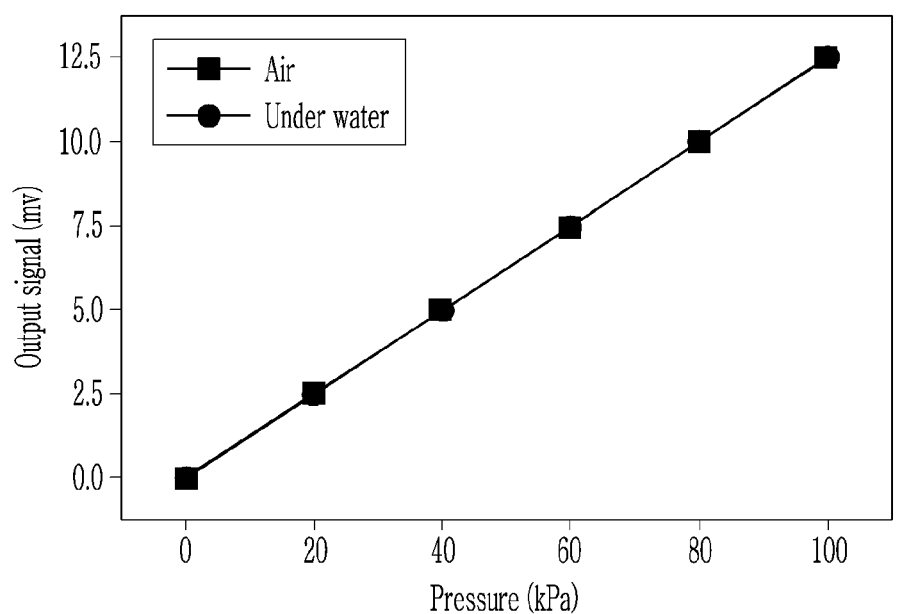
FIG. 8 shows a graph of a detection signal (voltage) according to a tactile sense load (pressure) when a tactile sense transmitting pneumatic unit of a tactile sensing sensor according to an exemplary embodiment of the present invention is provided in the air and in the water.

FIG. 8 shows a graph of a detection signal (voltage) according to a tactile sense load (pressure) when a pneumatic unit 100 is provided in the air or water while sensing a tactile sense by use of a tactile sensor 1000 according to an exemplary embodiment of the present invention.

It is found, as shown in FIG. 8 that, that when the pneumatic unit 100 is provided in the air as well as in the water, the change of voltage according to the increase of pressure linearly increases without generation of an error caused by an external condition, and the decrease of voltage according to the decrease of pressure linearly decreases. That is, hysteresis is minimized when the tactile sense load is sensed in the water.

It is not to be interpreted that the spirit of the present invention is limited to an exemplary embodiment described above. The present invention may be applied to various fields and may be variously modified by those skilled in the art without departing from the gist of the present invention. Therefore, these modifications and alterations are obvious to those skilled in the art and fall within the scope of the present invention claimed in the claims.

DESCRIPTION OF SYMBOLS

1000: pneumatic-based tactile sensor
100: tactile sense transmitting pneumatic unit
200: tactile sense receiving sensor unit
210: flux-based displacement unit
220: magnetic resistance sensor unit
300: tactile sense transmitting pneumatic line

The invention claimed is:

1. A pneumatic-based tactile sensor comprising:
a tactile sense transmitting pneumatic unit for generating pneumatic pressure by an external load applied to a first side; and
a tactile sense receiving sensor unit for measuring the load by transforming a magnitude of pneumatic pressure of the tactile sense transmitting pneumatic unit into a displacement,
wherein the tactile sense transmitting pneumatic unit includes:
a housing including an inside in which a first space is formed, a first side in which a first opening is formed, and a second side on which a pneumatic outlet is formed;
a sensing membrane made of an elastic material for closing and sealing the first opening; and
a tactile sense receiving block configured for directly sensing a tactile sense load and attached to the sensing membrane, and
wherein a cross-section of the tactile sense receiving block is smaller than a cross-section of the sensing membrane.

2. The pneumatic-based tactile sensor of claim 1, wherein the tactile sense receiving sensor unit includes one of a magnetic resistance sensor, a capacitance sensor, a piezo-resistive sensor, and a contact resistance sensor.

3. The pneumatic-based tactile sensor of claim 1, wherein the tactile sense receiving sensor unit includes:
a flux-based displacement unit for transforming a magnitude of pneumatic pressure of the tactile sense transmitting pneumatic unit into a flux intensity; and
a magnetic resistance sensor unit for measuring a size of the load by sensing a flux intensity of the flux-based displacement unit by use of a magnetic resistance sensor.

4. The pneumatic-based tactile sensor of claim 3, wherein the tactile sense receiving sensor unit is separately disposed from the tactile sense transmitting pneumatic unit, and further includes a tactile sense transmitting pneumatic line for connecting the tactile sense transmitting pneumatic unit and the flux-based displacement unit so as to transmit the pneumatic pressure of the tactile sense transmitting pneumatic unit to the tactile sense receiving sensor unit.

5. The pneumatic-based tactile sensor of claim 1, wherein a cross-section of the first opening is larger than a cross-section of the pneumatic outlet.

6. The pneumatic-based tactile sensor of claim 5, wherein the tactile sense receiving sensor unit includes a flux-based displacement unit for transforming a magnitude of pneumatic pressure of the tactile sense transmitting pneumatic unit into a flux intensity, and
the flux-based displacement unit includes an inside in which a second space is formed, a first side on which a pneumatic inlet connected to the pneumatic outlet is formed, and a second side in which a second opening is formed, and includes
a transmitting membrane for closing and sealing the second opening, and
a permanent magnet combined to the transmitting membrane.

7. The pneumatic-based tactile sensor of claim 6, wherein the magnetic resistance sensor unit includes an inside in which a third space is formed, and a first side in which a third opening is formed to be closed and sealed through the flux-based displacement unit,
the transmitting membrane and the permanent magnet are exposed through the third opening, and
the magnetic resistance sensor unit includes a magnetic resistance sensor installed to sense a flux of the permanent magnet.

8. The pneumatic-based tactile sensor of claim 6, wherein sensitivity and a measuring range of a tactile sensor are controlled according to a flux intensity of the permanent magnet or a position of the permanent magnet.

* * * * *